US005910401A

United States Patent [19]

[11] Patent Number: 5,910,401

[45] Date of Patent: Jun. 8, 1999

Anderson et al.

[54] GELATIN-MODIFIED POLYURETHANE AND POLYESTER FILM BASE

[75] Inventors: Charles C. Anderson, Penfield; Brian A. Schell, Honeoye Falls; Mario D. DeLaura, Hamlin, all of N.Y.

[73] Assignee: Eastman Kodak Company, Rochester, N.Y.

[21] Appl. No.: 09/090,576

[22] Filed: Jun. 4, 1998

[51] Int. Cl.[6] .......................... G03C 1/93; B32B 27/00; B32B 24/40

[52] U.S. Cl. .......................... 430/533; 430/531; 430/539; 430/537; 430/527; 430/510; 428/423.7

[58] Field of Search .......................... 430/531, 533, 430/539, 537, 628, 642, 510, 527; 428/423.7

[56] References Cited

U.S. PATENT DOCUMENTS

| | | | |
|---|---|---|---|
| 3,143,421 | 8/1964 | Nadeau et al. . | |
| 3,201,249 | 8/1965 | Pierce et al. . | |
| 4,695,532 | 9/1987 | Ponticello et al. | 430/533 |
| 4,855,219 | 8/1989 | Bagchi et al. | 430/523 |
| 5,066,572 | 11/1991 | O'Connor et al. | 430/537 |
| 5,248,558 | 9/1993 | Bagchi et al. | 430/537 |
| 5,330,885 | 7/1994 | Takamuki et al. | 430/537 |
| 5,378,592 | 1/1995 | Nakanishi et al. | 430/533 |
| 5,532,118 | 7/1996 | Bauer et al. | 430/533 |
| 5,639,589 | 6/1997 | Bauer et al. | 430/532 |
| 5,726,001 | 3/1998 | Eichorst | 430/531 |
| 5,786,134 | 7/1998 | Nair et al. | 430/531 |

FOREIGN PATENT DOCUMENTS

| | | |
|---|---|---|
| 583787 | 2/1994 | European Pat. Off. . |

*Primary Examiner*—Richard L. Schilling
*Attorney, Agent, or Firm*—Carl F. Ruoff

[57] ABSTRACT

The present invention is an imaging base which includes a polyester film support and an adhesion promoting layer directly adhered to a surface of the support. The adhesion promoting layer is formed by the coating and subsequent drying of a coating composition comprising a gelatin-grafted-polyurethane. The gelatin-grafted polyurethane is covalently bound to the polyurethane through a grafting agent wherein the ratio of gelatin to polyurethane is from 1:10 to 2:1. In one embodiment of the invention the imaging support is coated with at least one silver halide emulsion layer to form a photographic element.

10 Claims, No Drawings

GELATIN-MODIFIED POLYURETHANE AND POLYESTER FILM BASE

CROSS REFERENCE TO RELATED APPLICATIONS

This application relates to commonly assigned copending application Ser. No. 09/090,831, Docket 77,907) filed simultaneously. This application relates to commonly assigned copending application Ser. No. 09/090,579, filed simultaneously herewith. This application relates to commonly assigned copending application Ser. No. 09/090,578, filed simultaneously herewith. This application relates to commonly assigned copending application Ser. No. 09/090,827, filed simultaneously herewith.

FIELD OF THE INVENTION

The present invention relates to water-dispersible polyurethanes and to the use of such materials in photographic materials. In particular the invention relates to water-dispersible polyurethanes that have been grafted to gelatin and the use of these compositions in adhesion promoting layers for polyester film base.

BACKGROUND OF THE INVENTION

It is difficult to adhere photographic emulsions to oriented polyester supports, such as polyethylene terephthalate and polyethylene naphthalate. This problem is exacerbated by the conditions to which photographic elements are subjected; i.e., the adhesion must not fail in the raw and processed dry state, as well as when the film is wet during the development process.

Several adhesion promoting "subbing" materials, such as poly(methyl acrylate-co-vinylidene chloride-co-itaconic acid) and poly(acrylonitrile-co-vinylidene chloride-co-acrylic acid) disclosed in U.S. Pat. Nos. 3,201,249 and 3,143,421, respectively, provide the required adhesion when applied before orientation but are not as effective when applied on oriented support. The effectiveness of these adhesive materials may be enhanced by the use of swelling or attack agents such as resorcinol.

An alternative approach disclosed in U.S. Pat. No. 4,695,532 describes a discharged treated polyester film support having coated directly thereon a crosslinked layer of an aqueous vinyl acrylate copolymer and gelatin mixture. Although this system has good adhesion before processing, the adhesion performance is severely degraded by photographic developing solutions.

U.S. Pat. No. 5,639,589 discloses a polyester film support having a surface bearing an improved subbing layer which comprises a mixture of gelatin and a vinyl polymer in which the ratio of gelatin to polymer and the dry coverage of the layer are specified.

EP 0583787 A2 discloses the use of glow discharge treatment to enhance the adhesion of photographic elements. This treatment involves the use of high energy plasma under vacuum which requires specific equipment.

U.S. Pat. No. 5,378,592 discloses the use of a two-layer subbing layer (for photographic materials) wherein the first subbing layer is a layer of polyurethane latex cured with an epoxy compound or a dichloro-s-triazine derivative, and the second subbing layer is a hydrophilic colloid layer comprising gelatin.

U.S. Pat. No. 5,532,118 describes the use of a layer of a self-crosslinking polyurethane as an adhesion promoting material for polyester film support. The polyurethane was not gelatin-grafted nor did the adhesion promoting layer contain gelatin.

It is desirable to provide polyester film supports having improved wet and dry adhesion of hydrophilic colloid emulsions. It is also desirable to provide such supports that are free of photosensitive active materials.

U.S. Pat. Nos. 4,855,219, 5,066,572, 5,248,558, 5,330,885, and others, describe gelatin-coated latex polymers and gelatin-grafted latex polymers and their use in photographic elements. Typically, these latex polymers are either soft or hard (meth)acrylate copolymer latexes that are added to protective overcoats for silver halide emulsion layers to improve resistance to scratch, abrasion, and ferrotyping or are added to interlayers or silver halide emulsion layers to reduce pressure sensitivity.

SUMMARY OF THE INVENTION

The present invention is an imaging base which includes a polyester film support and an adhesion promoting layer directly adhered to a surface of the support. The adhesion promoting layer is formed by the coating and subsequent drying of a coating composition comprising a gelatin-grafted-polyurethane. The gelatin-grafted polyurethane is covalently bound to the polyurethane through a grafting agent wherein the ratio of gelatin to polyurethane is from 1:10 to 2:1. In one embodiment of the invention the imaging support is coated with at least one silver halide emulsion layer to form a photographic element.

DETAILED DESCRIPTION OF THE INVENTION

The invention provides a photographic element having a polyester support and at least one light-sensitive layer, the support having at least one surface coated with a gelatin-grafted polyurethane. The gelatin-grafted polyurethane coating compositions of the invention provide excellent adhesion to the polyester support and to overlying hydrophilic colloid-containing layers.

In the process of making a photographic element in accordance with this invention, the polyurethane adhesive promoting layer may be applied to the polyester film support either during the preparation of the film support or subsequently thereto. That is, in the preparation of polyester film supports, the polymer is melt extruded into a sheet and subsequently oriented by stretching in both the machine and transverse directions and subsequently treated by several steps including heat treating, heat relaxing, annealing, and the like. This procedure is well known in the art and requires no further explanation. The coating composition comprising the gelatin-grafted polyurethane may be applied at any stage in the known process of preparing polyester photographic film base, including before orienting, between the orienting steps, or before or after any of the subsequent steps in the preparation of the support. The application of the gelatin-grafted polyurethane coating composition is particularly advantageous after completion of the orientation of the polyester support. Compared with the prior art U.S. Pat. Nos. 5,378,592 and 5,532,118 which utilize a polyurethane adhesion promoting layer with a thin gelatin adhesion promoting layer over the polyurethane layer the present invention combines the function of these two layers in a single layer, therefore reducing manufacturing complexity.

Suitable polyester film supports are polymeric linear polyesters of bifunctional aromatic dicarboxylic acids and dihydroxy organic compounds. Generally, they are polyesters derived from terephthalic acid or naphthalene dicarboxylic acids and alkylene glycols. Polyester film supports are well known and can be prepared from any of the polyester compositions described, for example, in Nadeau U.S. Pat. No. 2,943,937 or in Alles et al., U.S. Pat. No. 2,627,088. Suitable polyester for use as supports include those prepared from dicarboxylic acids or derivatives thereof, such as terephthalic acid, isophthalic acid, 2,6-naphthalene dicarboxylic acid, 2,7-naphthalene dicarboxylic acid, adipic acid, succinnic acid and mixtures thereof and glycols, such as, ethylene glycol, propylene glycol, butylene glycol, hexamethylene glycol, cyclohexane diol, 1,4-cyclohexane dimethylol, and mixtures thereof. Especially useful polyester film supports are poly(ethylene terephthalate) or poly(ethylene naphthalate).

The supports preferably are initially treated with corona discharge (CDT), UV, glow discharge (GDT), flame or other such methods that alter the support surface. Corona discharge treatment is described in U.S. Pat. No. 4,695,532 and glow discharge treatment is described in U.S. Pat. No. 5,425,980; U.S. Pat. Nos. 3,288,638; 3,837,886; 4,451,497; 4,933,267; and EPO application 92/3035562, all of which are incorporated herein by reference.

The gelatin-grafted polyurethane coating composition is applied to the polyester film support from an aqueous dispersion using well-known coating techniques such as hopper coating, air-knife coating, gravure coating, roller coating, dip coating, spray coating, wire rod coating, and curtain coating.

The polyurethanes useful in the present invention are water dispersible polyurethanes containing carboxylate groups, such as carboxylic acid or carboxylic acid salt groups, that are covalently bonded to gelatin with the aid of a grafting agent. Water dispersible polyurethanes are well known and are prepared by chain extending a prepolymer containing terminal isocyanate groups with an active hydrogen compound, usually a diamine or diol. The prepolymer is formed by reacting a diol or polyol having terminal hydroxyl groups with excess diisocyanate or polyisocyanate. To permit dispersion in water, the prepolymer is functionalized with hydrophilic groups. Anionic, cationic, or nonionically stabilized prepolymers can be prepared.

Anionic dispersions contain usually either carboxylate or sulphonate functionalized co-monomers, e.g., suitably hindered dihydroxy carboxylic acids (dimethylol propionic acid) or dihydroxy sulphonic acids. Cationic systems are prepared by the incorporation of diols containing tertiary nitrogen atoms, which are converted to the quaternary ammonium ion by the addition of a suitable alkylating agent or acid. Nonionically stabilized prepolymers can be prepared by the use of diol or diisocyanate co-monomers bearing pendant polyethylene oxide chains. These result in polynrethanes with stability over a wide range of pH. Nonionic and anionic groups may be combined synergistically to yield "universal" urethane dispersions. For the purpose of the present invention, the polyurethane dispersion contains anionic groups that are carboxylic acid salt groups. The polyurethane dispersion may also contain nonionic groups in combination with the carboxylic acid salt anionic groups. In order to provide sufficient carboxylate groups for grafting it is necessary that the polyurethane has an acid number of at least 5. Acid number is defined as the milligrams of KOH required to neutralize one gram of polymer.

The polyurethane dispersion useful for the purpose of the present invention may be a self-crosslinking polyurethane derived from an isocyanate terminated prepolyrner extended with an aliphatic polyamine and end-capped with N-methylol hydrazide groups such as those described in U.S. Pat. No. 5,532,118, incorporated herein by reference. For the purpose of the present invention, it is preferable that the polyurethane be an aliphatic polyurethane to prevent yellowing upon aging or archiving of the photographic film.

One of several different techniques may be used to prepare polyurethane dispersions. For example, the prepolymer may be formed, neutralized or alkylated if appropriate, then chain extended in an excess of organic solvent such as acetone or tetrahydrofuran. The prepolymer solution is then diluted with water and the solvent removed by distillation. This is known as the "acetone" process. Alternatively, a low molecular weight prepolymer can be prepared, usually in the presence of a small amount of solvent to reduce viscosity, and chain extended with diamine just after the prepolymer is dispersed into water. The latter is termed the "prepolymer mixing" process and for economic reasons is much preferred over the former.

Polyols useful for the preparation of polyurethane dispersions include polyester polyols prepared from a diol (e.g. ethylene glycol, butylene glycol, neopentyl glycol, hexane diol or mixtures of any of the above) and a dicarboxylic acid or an anhydride (succinic acid, adipic acid, suberic acid, azelaic acid, sebacic acid, phthalic acid, isophthalic acid, maleic acid and anhydrides of these acids), polylactones from lactones such as caprolactone reacted with a diol, polyethers such as polypropylene glycols, and hydroxyl terminated polyacrylics prepared by addition polymerization of acrylic esters such as the aforementioned alkyl acrylate or methacrylates with ethylenically unsaturated monomers containing functional groups such as carboxyl, hydroxyl, cyano groups and/or glycidyl groups.

Diisocyanates that can be used are as follows: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cycopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)-methane, 4,4' diisocyanatodiphenyl ether, tetramethyl xylene diisocyanate and the like.

Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like. Suitable tertiary amines which are used to neutralize the acid and form an anionic group for water dispersibility are trimethylamine, triethylamine, dimethylaniline, diethylaniline, triphenylamine and the like.

Diamines suitable for chain extension of the polyurethane include ethylenediamine, diaminopropane, hexamethylene diamine, hydrazine, aminoethylethanolamine and the like.

Solvents which may be employed to aid in formation of the prepolymer and to lower its viscosity and enhance water dispersibility include methylethylketone, toluene, tetrahydrofuran, acetone, dimethylformamide, N-methylpyrrolidone, and the like. Water-miscible solvents like N-methylpyrrolidone are much preferred.

The gelatin to be covalently bound to the polyurethane can be any of the known types of gelatin. These include, for example, alkali-treated gelatin (cattle bone or hide gelatin), acid-treated gelatin pigskin or bone gelatin), and gelatin derivatives such as partially phthalated gelatin, acetylated gelatin, and the like, preferably the deionized gelatins. The gelatin covalently bound to the polyurethane may be crosslinked through the use of a coventional crosslinking agent. The ratio of gelatin to polyurethane is between 1 to 10 and 3 to 1, preferably between 1 to 4 and 3 to 1.

Suitable grafting agents that can be utilized for the attachment of gelatin to the polyurethane are the carbamoylonium salts, dication ethers, and carbodiimides described in U.S. Pat. No. 5,248,558, incorporated herein by reference. The carbamoylonium compounds useful in the practice of the present invention can be obtained commercially, or prepared using known procedures and starting materials, such as described in U.S. Pat. No. 4,421,847 and references noted therein, incorporated herein by reference. Representative preferred carbamoylonium compounds include 1-(4-morpholinocarbonyl)-4-(2-sulfoethyl)pyridinium hydroxide, inner salt, and 1-(4-morpholinocarbonyl) pyridinium chloride.

Dication ethers are also useful as grafting agents for bonding gelatin to a polyurethane containing carboxylate groups. Useful dication ethers have the formula:

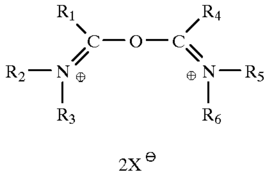

In this formula, $R_1$ represents hydrogen, alkyl, aralkyl, aryl, alkenyl, —$YR_7$, the group

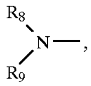, or the group 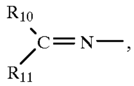, with Y representing sulfur or oxygen, and $R_7$, $R_8$, $R_9$, $R_{10}$, and $R_{11}$, each independently representing alkyl, alkyl, aralkyl, aryl, or alkenyl. Alternatively, $R_8$ and $R_9$, or $R_{10}$ and $R_{11}$ may together form a ring structure. $R_{10}$ and $R_{11}$ may each also represent hydrogen. Also, $R_1$ together with $R_2$ may form a heterocyclic ring.

$R_2$ and $R_3$ each independently represents alkyl, aralkyl, aryl, or alkenyl, or, combined with $R_1$ or each other, forms a heterocyclic ring. $R_4$, $R_5$, and $R_6$ are independently defined as are $R_1$, $R_2$, and $R_3$, respectively, and can be the same as or different from $R_1$, $R_2$, and $R_3$.

$X^-$ represents an anion or an anionic portion of the compound to form an intramolecular (inner) salt. The ethers above can be made by techniques known to those skilled in the chemical synthesis art. Useful synthesis techniques include those described in *Journal Of American Chemical Society*, 103, 4839 (1981).

Carbodiimides can also be used to attach gelatin to carboxylated polyurethanes. Particularly preferred carbodiimide grafting agents are water-soluble carbodiimides of the formula:

$R_{12}$—N=C=N—$R_{13}$ wherein each of $R_{12}$ or $R_{13}$ is selected form: cycloalkyl having from 5 to 6 carbon atoms in the ring: alkyl of from 1 to 12 carbon atoms; monoarylsubstituted lower alkyl radicals, e.g., benzyl-α- and β-phenylethyl; monoaryl radicals, e.g., phenyl; morpholino; piperidyl; morpholinyl substituted with lower alkyl radicals, e.g., ethylmorpholinyl; piperidyl substituted with lower alkyl radicals, e.g., ethylpiperidyl; di-lower alkylamino; pyridyl substituted with lower alkyl radicals, e.g., α, β, γ-methyl-or ethyl-pyridyl; acid addition salts; and quaternary amines thereof.

For the grafting of gelatin to the polyurethane dispersion, the polyurethane dispersion is preferably first contacted with the grafting agent and then with gelatin, so that the gelatin preferentially reacts with the polyurethane, instead of gelatin-gelatin cross-linking. Carbamoylpyridinium and dication ether grafting agents are advantageously utilized in the practice of this invention as these may be employed to selectively bond to a carboxyl group on a polymer particle and then with an amino group on the gelatin molecule. Carbamoylpyridinium compounds are particularly preferred.

The contacting of the polyurethane and gelatin is preferably performed in an aqueous medium. The concentration of polyurethane in the aqueous dispersion is preferably less than about 25% and more preferably less than about 15% by weight. The concentration of gelatin in the aqueous dispersion is preferably less than about 25% and more preferably less than about 15% by weight.

The pH of the aqueous dispersion and the concentration of the polyurethane and gelatin should be adjusted to prevent bridging of gelatin molecules between the polyurethane dispersion, or coagulation. The pH of the gelatin is preferably maintained above the isoelectric pH of the gelatin (e.g., above 4.8 and preferably between 8 and 10 for lime-processed bone gelatin). Under such conditions, both the polyurethane dispersion and the gelatin should have the same charge, preferably negative, in order to minimize coagulation. It is preferred for this invention that the gelatin-grafted polyurethane dispersion be washed extensively either by dialysis or diafiltration to remove traces of reaction byproducts and low molecular weight species.

The gelatin-grafted polyurethane dispersions of the invention can be used in coating compositions alone or in combination with other water-dispersible or water soluble polymers, including; latex polymers prepared from ethylenically unsaturated monomers such as (meth)acrylic acid, (meth)acrylic acid esters, styrene and its derivatives, vinyl halides, itaconic acid and its mono- and di-esters, maleic acid and its mono- and di-esters, (meth)acrylonitrile, (meth) acrylamides, olefins, and others; water dispersible polyurethanes and polyesters; hydrophilic colloids such as gelatin, dextran, gum arabic, zein, cassein, pectin, agar—agar, polyvinyl alcohol, poly(vinyl pyrrolidone), and the like. Preferably, the gelatin-grafted polyurethane dispersions of the invention comprise from about 50 to 100 weight % of the dried adhesion promoting layer.

Coatings containing the gelatin-grafted polyurethane dispersions may additionally include; crosslinking agents such as aziridines, carbodiimides, epoxides, triazines, polyisocyanates, and methoxyalkyl melamines; gelatin hardeners such as those described, for example, in Research Disclosure No. 38957, September 1996, pages 599 to 600; surfactants and coating aids; rheology modifiers; and inorganic or polymeric matting agents.

The total dried coating weight for the adhesion promoting layer of the invention is from about 10 to about 5000 $mg/m^2$, preferably from about 50 to 500 $mg/m^2$.

The photographic elements of this invention are photographic films in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar—agar, arrowroot, albumin, and the like. Still other useful hydrophilic colloids are water-soluble polyvinyl compounds such as polyvinyl alcohol, polyacrylamide, poly(vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, antistatic layers, magnetic recording layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and the references listed therein.

The photographic silver halide emulsions utilized in this invention can contain other addenda conventional in the photographic art. Useful addenda are described, for example, in Research Disclosure, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The photographic processing steps to which the raw film may be subject may include, but are not limited to the following:

1) color developing→bleach-fixing→washing/stabilizing;

2) color developing→bleaching→fixing→washing/stabilizing;

3) color developing→bleaching→bleach-fixing→washing/stabilizing;

4) color developing→stopping→washing→bleaching→washing→fixing→washing/stabilizing;

5) color developing→bleach-fixing→fixing→washing/stabilizing;

6) color developing→bleaching→bleach-fixing→fixing→washing/stabilizing;

Among the processing steps indicated above, the steps 1), 2), 3), and 4) are preferably applied. Additionally, each of the steps indicated can be used with multistage applications as described in Hahm, U.S. Pat. No. 4,719,173, with co-current, counter-current, and contraco arrangements for replenishment and operation of the multistage processor.

Any photographic processor known to the art can be used to process the photosensitive materials described herein. For instance, large volume processors, and so-called minilab and microlab processors may be used. Particularly advantageous would be the use of Low Volume Thin Tank processors as described in the following references: WO 92/10790; WO 92/17819; WO 93/04404; WO 92/17370; WO 91/19226; WO 91/12567; WO 92/07302; WO 93/00612; WO 92/07301; WO 02/09932; U.S. Pat. No .5,294,956; EP 559,027; U.S. Pat. No. 5,179,404; EP 559,025; U.S. Pat. No. 5,270,762; EP 559,026; U.S. Pat. No. 5,313,243; U.S. Pat. No. 339,131.

The present invention is also directed to photographic systems where the processed element may be re-introduced into the cassette. These system allows for compact and clean storage of the processed element until such time when it may be removed for additional prints or to interface with display equipment. Storage in the roll is preferred to facilitate location of the desired exposed frame and to minimize contact with the negative. U.S. Pat. No. 5,173,739 discloses a cassette designed to thrust the photographic element from the cassette, eliminating the need to contact the film with mechanical or manual means. Published European Patent Application 0 476 535 A1 describes how the developed film may be stored in such a cassette.

The present invention will now be described in detail with reference to examples; however, the invention should not be limited to these examples.

EXAMPLES

Preparation of Gelatin-Grafted Polyurethane Dispersion

Gelatin-grafted polyurethane P-1: A commercially available, water-dispersible polyurethane (Witcobond 236, a product of Witco Corp.) was grafted to gelatin at a weight ratio of 60 parts polyurethane to 40 parts gelatin by the following procedure: 213 g of polyurethane dispersion (20% solids) and 200 g distilled water were introduced to a 2 liter round-bottom 3-necked flask equipped with a condenser and overhead stirrer. The flask was immersed in a constant temperature bath at 60° C. 1.1 g of 1-(4-morpholinocarbonyl)-4-(2-sulfoethyl)pyridinium hydroxide, inner salt was dissolved in 75 g of water and added to the diluted polyurethane dispersion. Reaction was continued for 40 minutes, during which time 27.8 g of gelatin was dissolved in 250 g of water with heating at 60° C. and neutralized to pH 9 with triethylamine. The gelatin solution was then added via dropping funnel and the grafting reaction allowed to proceed for another 30 minutes. After cooling to 40° C. the product was filtered, with very little insoluble matter observed, then refrigerated. The gelatin-grafted polyurethane dispersion so obtained was stable to storage for months.

Gelatin-grafted polyurethanes P-2 and P-3: Additional gelatin-grafted polyurethanes were prepared in a manner analogous to that used to prepare P-1. For P-2 and P-3, Witcobond 236 was used as the polyurethane dispersion that was grafted to gelatin at a weight ratio of 75 parts polyurethane to 25 parts gelatin for P-2, and 25 parts polyurethane to 75 parts gelatin for P-3.

The above gelatin-grafted polyurethane dispersions were used in the following example coating compositions.

Testing:

Adhesion for the coatings was tested by placing the samples in film developer at 35° C. for 1 minute. While still wet, a one millimeter wide line was scribed in the coating and a hard rubber pad was rubbed across the scribe line. The change in the width of the scribe line was used as a measure of the adhesion (i.e., excellent adhesion in this test means no observable change in the width of the scribe line). Samples were incubated for 24 hours at 30° C. and 50% RH prior to adhesion testing.

Examples 1 to 3 and Comparative Samples A to C

The following examples demonstrate the utility of the gelatin-grafted polyurethanes of the invention as an adhesion promoting layer. The following compositions were applied onto a corona discharge treated, biaxially oriented polyethylene terephthalate film support and dried at 130° C. for 2 minutes to give a layer with a dried coating weight of 100 $mg/m^2$.

Example 1

Polymer P-1 0.7 wt %
Triton X-100 Surfactant (Rohm & Haas) 0.06 wt %
CX100 polyfunctional aziridine (Zeneca Resins) 0.035 wt %
water balance

Example 2

Polymer P-2 0.7 wt %
Triton X-100 Surfactant (Rohm & Haas) 0.06 wt %
CX100 polyfunctional aziridine (Zeneca Resins) 0.035 wt %
water balance

Example 3

Polymer P-3 0.7 wt %
Triton X-100 Surfactant (Rohm & Haas) 0.06 wt %
CX100 polyfunctional aziridine (Zeneca Resins) 0.035 wt %
water balance These coatings gave excellent adhesion to the energy-treated film support. These layers were also overcoated with a 5000 $mg/m^2$ gelatin layer to simulate overcoating the adhesion promoting layer with a hydrophilic silver halide emulsion layer or curl control layer. After coating, the thick gelatin layer was chill-set at 5° C. and first dried at 21° C. and then at 38° C. This gelatin overcoat layer also contained about 1 wt % of a bis(vinylsulfonylmethyl)ether gelatin-hardening agent. These examples gave good to excellent adhesion of the gelatin overcoat to the film support.

For comparison purposes, the following coatings were applied and tested for adhesion. Comparative Sample A, which is a poly(methyl acrylate-co-vinylidene chloride-co-itaconic acid) terpolymer latex that is well known in the photographic art as a priming layer for photographic film support and described in U.S. Pat. No. 3,143,421, was applied onto a corona discharge treated, biaxially oriented polyethylene terephthalate film support and dried at 130° C. for two minutes.

Comparative Sample B comprised the above mentioned terpolymer latex with 40 weight % gelatin added to the coating. The coating was prepared in an analogous manner to that described above for Sample A.

Comparative Sample C comprised Witcobond 236 polyurethane with 40 weight % gelatin added to the coating. In this sample, the gelatin was not grafted to the polyurethane. The coating was as made as described above. The coatings of Samples A, B, and C were then overcoated with the thick gelatin layer described above and tested for adhesion. Comparative Samples A and B gave very poor adhesion results with almost complete removal of the thick gelatin layer from the film support. Comparative Sample C gave only fair adhesion.

The invention has been described in detail with particular reference to certain preferred embodiments thereof, but it will be understood that variations and modifications can be effected within the spirit and scope of the invention.

What is claimed is:

1. An imaging base comprising:

a polyester film support;

an adhesion promoting layer directly adhered to a surface of said support formed by the coating and subsequent drying of a coating composition comprising gelatin-grafted polyurethane comprising gelatin covalently bound to a polyurethane through a grafting agent, wherein a ratio of gelatin to polyurethane is from 1:10 to 2:1.

2. The imaging base of claim 1, wherein said grafting agent comprises carbamoylonium salts, dication ethers or carbodiimides.

3. The imaging base of claim 1, wherein said coating composition further comprises another polymer selected from the group consisting of water soluble polymers or water dispersible polymers.

4. The imaging base of claim 1, wherein the coating composition further comprises crosslinking agents, conductive agents, fillers, magnetic recording particles, dyes, pigments, coating aids, surfactants, rheology modifiers, lubricating agents or matting agents.

5. The imaging base of claim 1 wherein said support comprises poly(ethylene terephthalate) or poly(ethylene naphthalate).

6. A photographic element comprising:

a polyester film support;

an adhesion promoting layer directly adhered to a surface of said support formed by the coating and subsequent drying of a coating composition comprising gelatin-grafted polyurethane comprising gelatin covalently bound to a polyurethane through a grafting agent, wherein a ratio of gelatin to polyurethane is from 1:10 to 2:1.

at least one silver halide emulsion layer superposed on said support.

7. The photographic element of claim 6, wherein said grafting agent comprises carbamoylonium salts, dication ethers or carbodiimides.

8. The photographic element of claim 6, wherein said coating composition further comprises another polymer selected from the group consisting of water soluble polymers or water dispersible polymers.

9. The photographic element of claim 6, wherein the coating composition further comprises crosslinking agents, conductive agents, fillers, magnetic recording particles, dyes, pigments, coating aids, surfactants, rheology modifiers, lubricating agents or matting agents.

10. The photographic element of claim 6 wherein said support comprises poly(ethylene terephthalate) or poly (ethylene naphthalate).

* * * * *